Oct. 11, 1949.  E. H. DESMOULINS  2,484,273
PROPELLER UNIT FOR AIRCRAFT
Filed May 25, 1940

Inventor
Emile H. Desmoulins

By William C. Linton
Attorney

Patented Oct. 11, 1949

2,484,273

UNITED STATES PATENT OFFICE 2,484,273

PROPELLER UNIT FOR AIRCRAFT

Emile Hyacinthe Desmoulins, Issy-les-Moulineaux, France

Application May 25, 1940, Serial No. 337,295
In France March 7, 1939

Section 3, Public Law 690, August 8, 1946
Patent expires March 7, 1959

2 Claims. (Cl. 74—785)

The present invention relates to propeller units for aeroplanes having two propellers capable of being driven in opposite directions by a common motor and it is an object of the invention to provide a transmission between the propellers and the driving shaft of the motor therefor which will reduce the reaction torque between each propeller and this torque is wholly or partially counterbalanced by the reaction torque of the opposed propeller. Furthermore, the reversing torque acting upon the unit will be wholly or partially annulled and still further the propellers being provided with braking devices, this torque can be controlled so that it will be less than that of the driving torque of the motor for the propellers, resulting in the better handling of the aeroplane or other aircraft when taking off from the ground, when in flight, and the control of their transverse balance, the maintenance of this balance and the modification of this balance.

Other objects of the invention will be in part obvious and in part pointed out hereinafter as the description continues.

Figure 1:
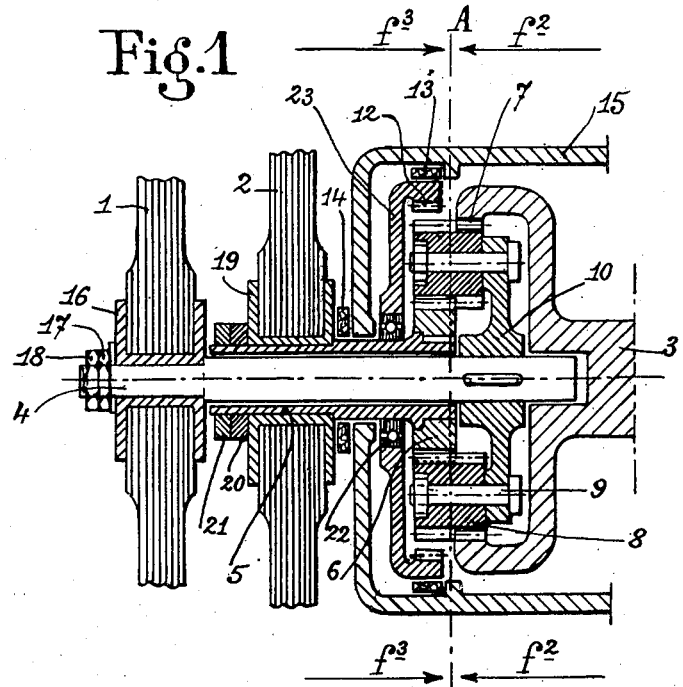
Fig. 1 is a vertical longitudinal sectional view through the propeller unit embodying the invention.

The propellers 1 and 2 as shown herein may be of the design and size required by the aircraft to which the unit is applied, but should have reverse pitches or the forward propeller may be of less diameter than that of the rear propeller. These propellers are arranged coaxial with each other and with the common driving shaft 3 of the motor therefor. The stub shaft 4 has secured to the outer reduced end thereof by means of the lock-nuts 17 and 18 a hub 16 and to the latter of which is fixed the forward propeller 1. Journalled upon and arranged concentrically with the shaft 4 is a tubular shaft 5 having secured to its outer end by means of the lock-nuts 20 and 21 the hub 19 carrying the rearward propeller 2. A brake band 14 is in engagement with the tubular shaft 5 whereby the rotation of the latter may be controlled. This tubular shaft is supported by and journalled within a suitable bearing formed with the gear housing 15.

Figure 2:
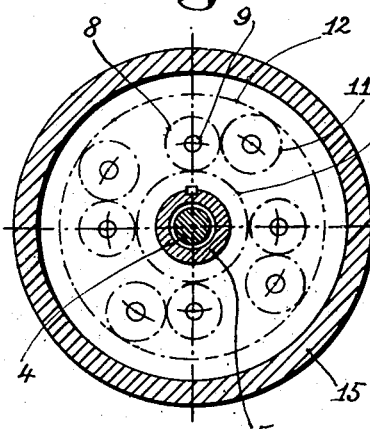
Fig. 2 is a vertical transverse sectional view taken on the line A—B in the direction of the arrow points $f^2$.
Figure 3:
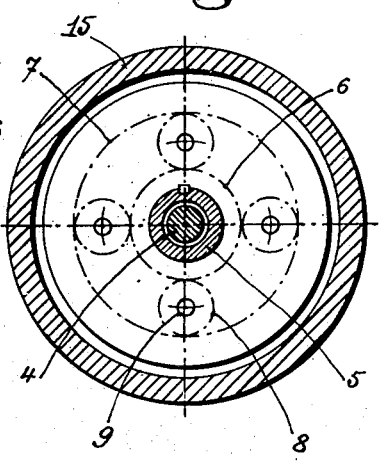
Fig. 3 is a similar vertical transverse sectional view taken on the line A—B in the direction of the arrow points $f^3$.

A driven gear 6 is keyed to the inner end of the tubular shaft 5 so that the propeller 2 may rotate therewith. An internal driving gear 7 is integral with the shaft 3 and the diameter of the latter exceeds that of the sun gear 6 and the gears 6 and 7 are provided with spur teeth. The inner end of the stub shaft 4 is journalled within the shaft 3 and has keyed thereto a carrier 10. A plurality of spindles 9 are secured to and extend from one face of the carrier 10 and each spindle has journalled thereon a relatively long pinion 8 of the planetary gearing which pinion meshes with the spur teeth of the gears 6 and 7 so that upon the rotation of the driving shaft 3 the propellers will be caused to rotate therewith in opposite directions. The tubular shaft 5 has a ball bearing raceway 22 thereupon which supports for free rotation a brake drum 23 and a band 13 is capable of engaging this drum for applying a braking action thereto. An internal spur tooth gear 12 is formed on the drum 23 and meshes with the orbital gearing consisting of the pinions 11 which latter are also in mesh with the pinions 8 as is illustrated in Fig. 2 of the drawings. Also extending from one face of the carrier 10 are additional spindles and upon each of which is journalled a pinion 11 whereby the latter will extend parallel with the pinions 8. Through this orbital gearing the speed of rotation of the stub-shaft 4 is controlled by the brake band 13. From the foregoing it is apparent that this reactionary gear 12 may be free to rotate with the planetary pinions or through the braking band 13 may be retained stationary or permitted to rotate at a reduced speed than that of the carrier 10 which latter supports the planetary pinions.

I claim:

1. A propeller unit for aircraft comprising in combination a driving shaft, a driven shaft, a tubular driven shaft journalled upon said driven shaft, a propeller carried by said driven shaft and by said tubular shaft, said shafts being coaxially arranged, a driven gear keyed to said tubular shaft, a carrier keyed to said driven shaft, a driving gear carried by said driving shaft and of a diameter greater than that of said driven gear, pinions operatively connecting said driven gear with the gear carried by said driving shaft, a brake drum, an internal gear formed on said brake drum, orbital gears operatively connecting said pinions with said brake drum and a brake drum operatively connected to said tubular shaft.

2. A propeller unit for aircraft comprising in combination a driving shaft, a stub-shaft arranged coaxially thereto and having its inner end spigotted therein, a propeller secured to the outer end of said stub-shaft, a tubular shaft journalled upon said stub-shaft, a gear housing, said tubular shaft being journalled within said housing, a propeller secured to the outer end of said tubular shaft, a sun gear keyed to the inner end of said tubular shaft, a carrier keyed to the inner end of said stub-shaft, pinions journalled upon one face of said carrier, a driving gear carried by said driving shaft and of a diameter greater than that of said sun gear, said sun gear and driving gear meshing with said pinions, a brake drum journalled upon said tubular shaft, an internal gear formed on said brake drum, a plurality of orbital gears journalled upon said carrier and in mesh with said pinions, and the internal gear being arranged concentrically with respect to said pinions, and a brake operatively connected to said tubular shaft.

EMILE HYACINTHE DESMOULINS.

REFERENCES CITED

The following references are of record in the file of this patent:

UNITED STATES PATENTS

| Number | Name | Date |
|---|---|---|
| 1,291,126 | Porter | Jan. 14, 1919 |
| 1,431,683 | Ramsey | Oct. 10, 1922 |
| 1,654,432 | Rowledge | Dec. 27, 1927 |
| 1,755,804 | Barbarou | Apr. 22, 1930 |
| 1,992,333 | Stelzer | Feb. 26, 1935 |
| 2,067,023 | Schleicher | Jan. 5, 1937 |
| 2,085,483 | Trebucien | June 29, 1937 |
| 2,154,532 | Ryder | Apr. 18, 1939 |
| 2,208,156 | Gilbert | July 16, 1940 |
| 2,262,797 | Chapman | Nov. 18, 1941 |

FOREIGN PATENTS

| Number | Country | Date |
|---|---|---|
| 9413A | Great Britain | Apr. 23, 1907 |
| 421,889 | Great Britain | Dec. 24, 1934 |
| 722,339 | France | Dec. 29, 1931 |